(12) United States Patent
Filgertshofer (10) Patent No.: US 11,465,196 B2
(45) Date of Patent: Oct. 11, 2022

(54) METHOD FOR MANUFACTURING A ROTOR SHAFT AND ROTOR SHAFT

(71) Applicant: Hirschvogel Umformtechnik GmbH, Denklingen (DE)

(72) Inventor: Robert Filgertshofer, Reichling (DE)

(73) Assignee: HIRSCHVOGEL UMFORMTECHNIK GMBH, Denklingen (DE)

( * ) Notice: Subject to any disclaimer, the term of this patent is extended or adjusted under 35 U.S.C. 154(b) by 836 days.

(21) Appl. No.: 16/336,499

(22) PCT Filed: Sep. 26, 2017

(86) PCT No.: PCT/EP2017/074280
§ 371 (c)(1),
(2) Date: Mar. 26, 2019

(87) PCT Pub. No.: WO2018/055176
PCT Pub. Date: Mar. 29, 2018

(65) Prior Publication Data
US 2021/0276073 A1 Sep. 9, 2021

(30) Foreign Application Priority Data
Sep. 26, 2016 (DE) .................... 10 2016 118 122.6

(51) Int. Cl.
*H02K 7/00* (2006.01)
*B21K 1/06* (2006.01)
(Continued)

(52) U.S. Cl.
CPC .............. *B21K 1/063* (2013.01); *B21K 25/00* (2013.01); *B23P 11/005* (2013.01); *F16C 3/023* (2013.01);
(Continued)

(58) Field of Classification Search
CPC ........... H02K 7/003; F16D 1/10; F16C 3/023; B21K 25/00
(Continued)

(56) References Cited

FOREIGN PATENT DOCUMENTS

| DE | 4313296 A1 | 6/1994 |
|---|---|---|
| DE | 112005000616 T5 | 2/2007 |

(Continued)

OTHER PUBLICATIONS

International Preliminary Report on Patentability for corresponding application PCT/EP2017/074280 filed Sep. 26, 2017; dated Apr. 4, 2019.

(Continued)

*Primary Examiner* — Terrance L Kenerly
(74) *Attorney, Agent, or Firm* — Cantor Colburn LLP (57) ABSTRACT

A method for manufacturing a rotor shaft for an electrical aggregate, including providing a pin having a shaft plug-in, in particular a cylindrical shaft plug-in; producing a hollow rotor shaft body being open at least at a first end for receiving the pin and in form of a rotary body, where an oversize exists between at least one outer surface of the shaft plug-in and at least one inner surface of the rotor shaft body; and inserting the shaft plug-in into the rotor shaft body for fastening the pin to the rotor shaft body for finishing the rotor shaft, such that the process and operation of manufacturing a rotor shaft is simplified while at the same time reducing costs and material waste, and to produce a rotor shaft that can withstand high loads and transmit high torques.

7 Claims, 6 Drawing Sheets

(51) Int. Cl.
*B21K 25/00* (2006.01)
*B23P 11/00* (2006.01)
*F16C 3/02* (2006.01)
*F16D 1/10* (2006.01)

(52) U.S. Cl.
CPC .............. *F16D 1/10* (2013.01); *H02K 7/003* (2013.01); *F16D 2001/103* (2013.01)

(58) Field of Classification Search
USPC ...................................................... 310/75 d
See application file for complete search history.

(56) References Cited

FOREIGN PATENT DOCUMENTS

| | | |
|---|---|---|
| DE | 102010022621 A1 | 12/2011 |
| DE | 102014200642 A1 | 7/2015 |
| EP | 0694705 A1 | 1/1996 |
| JP | 0524455 A | 2/1993 |
| JP | 06312322 A | 11/1994 |

OTHER PUBLICATIONS

International Search Report for corresponding application PCT/EP2017/074280 filed Sep. 26, 2017; dated Jan. 18, 2018.

METHOD FOR MANUFACTURING A ROTOR SHAFT AND ROTOR SHAFT

TECHNICAL FIELD

The disclosure concerns a method for manufacturing a rotor shaft, in particular for an electric aggregate, preferably an electric motor or an electric generator, and a rotor shaft, in particular for such an electric aggregate.

BACKGROUND

A rotor shaft is a shaft that transmits the rotary motion and torque of an electric motor to downstream elements. Hollow rotor shafts are usually manufactured by first extruding a cylindrical blank or pipe blank and/or drilling or machining it hollow or massively forming it, for example forging it and then machining it hollow or pressing it hollow. The rotary body, being open on both sides, is then connected on both sides with attachments or connecting elements by press fitting and/or welding. These are used to support the shaft. Such a procedure is described in the "ATZ extra" for the manufacture of a built rotor shaft for an electric motor ("ThyssenKrupp InCar plus", October 2014 issue, pages 34-37).

In addition, DE 10 2010 022 621 A1 specifies a rotor shaft for an electrical aggregate consisting of several parts, which are connected by a press fit and/or are welded together.

However, such machining processes are costly, particularly in terms of time and money, due to the large number and complexity of the work processes required and the special care that must be taken to ensure the precision of the machining.

BRIEF SUMMARY

The disclosure is based further developing or improving the manufacture of a rotor shaft in terms of reduced complexity, reduced effort and/or reduced cost.

One aspect of the disclosure concerns a method for manufacturing a rotor shaft, in particular for an electrical aggregate, preferably an electric motor or generator. The procedure comprises the following steps:
 a) providing a pin comprising particularly a cylindrically formed shaft plug-in;
 b) producing a hollow rotor shaft body which is open at at least one first end for receiving the pin and is in the form of a rotary body, preferably cylindrical-symmetrical, wherein an oversize between at least one outer surface of the shaft plug-in and at least one inner surface of the rotor shaft body exists, and preferably the first shaft coupling is formed for a rotary coupling with a rotary shaft; and
 c) Inserting the shaft plug-in into the rotor shaft body to attach the pin to the rotor shaft body and complete the rotor shaft.

By "pin" the disclosure understands all types of pins, including hollow pins. The pin can be produced in step a) by forging, preferably impact extrusion, in particular forward and/or backward extrusion of a blank, and can be designed as a cover part for the open end of the rotor shaft body. Cylindrical and/or rotationally symmetrical forgings can be produced in a single operation in a particularly simple manner and with a very precise concentricity, whereby the axis of the inner contour and the axis of the outer contours are brought into line with sufficient precision so that the parts are largely unbalanced.

The cylinder-symmetrical rotor shaft body is advantageously equipped with a first shaft coupling at a second end. This can also be pushed in, pressed in or welded, but is preferably forged in one piece with the rotor shaft body. This has stability, manufacturing and cost advantages. The rotor shaft body and/or the pin are preferably manufactured by forging.

The manufacture of the rotor shaft body in step b) may be carried out as cold, warm or hot forming or hot forging, preferably impact extrusion, in particular forward and/or reverse impact extrusion of a blank, and may include at least one of the steps: Casting, rolling or forming of the blank and subsequent hardening, tempering, grinding. Forging can also be carried out as semi-hot forming if necessary. The manufacture of the rotor shaft body in step b) can also involve longitudinal welding of a rolled product such as a plate or drilling from a solid body. In addition to a longitudinal seam, helical seam shapes are also possible. The manufacturing process also includes the forming and connection of sheet metal strips to form a tube open on both sides or on one side, which then forms the rotor shaft body. The sheet strips are formed with advantage before welding, in particular hot and cold rolled, for example to bring them to the desired wall thickness.

The production of the rotor shaft body in step b) can also be a forming of a part open on one side, but also a tube which can be produced according to the tube continuous process or the push bench process. These two methods refer to a seamless tube production of 20-180 mm diameter. However, the disclosure prefers seamless rotor shaft bodies.

By rotor-shaft, disclosure means all rotating waves, i.e. also those which are not understood as rotor in narrow sense.

The material of the blank in steps a) and/or b), preferably steel, in particular pre-rolled steel, may have a fibre-like microstructure and thus a higher strength than a cast microstructure. In forging, the microstructure (fibre structure) is retained, the microstructure becomes uniformly fine-grained and thus even stronger. On the other hand, in machining processes the shape of the fibres interrupts the grain flow and reduces the strength.

Material costs in forging are lower than in other forming processes because material waste is reduced (less waste is produced). In addition, the time required for manufacturing by forming is reduced. Compared to a conventional process, this process simplifies the process and operation of manufacturing a rotor shaft while simultaneously reducing costs.

Another aspect of the disclosure concerns a rotor shaft for an electrical aggregate, preferably an electric motor or generator. The rotor shaft can comprise:
 a pin with a cylindrical shaft plug-in, and
 a rotor shaft body which is produced by forging and is in the form of a hollow rotary body which is particularly open at least one first end for receiving the pin and comprises a first shaft coupling at a second end,
wherein an oversize exists between at least one outer surface of the shaft plug-in and at least one inner surface of the rotor shaft body and the shaft plug-in is inserted, in particular pressed, into the open end of the rotor shaft body for fastening the pin to the rotor shaft body.

The oversize between the at least one outer surface of the shaft plug-in and the at least one inner surface of the rotor shaft body means that a shaft plug-in radius or radius of this outer surface of the shaft plug-in is at least partly larger than a radius of this inner surface of the rotor shaft body. The disclosure also understands outer surface of the shaft plug-in or inner surface of the rotor shaft body as partial surfaces of the outer wall of the shaft plug-in or the inner wall of the rotor shaft, including recesses such as grooves, notches, furrows, grooves or elevations such as cams, points, shafts, mountains or the like.

The shaft plug-in radius may be greater than an inner radius of the rotor shaft body in an area of a fixing element and preferably less than or equal to the inner radius of the rotor shaft body in an area outside a fixing element. If the radii are the same, there may be a transition tolerance, since the fixing elements can be pressed completely into the counter material. Compared to a press fit, the described form of the outer surface of the shaft plug-in in step c) of the process enables the shaft plug-in to be inserted more easily and precisely into the rotor shaft body and a toothing or frictional connection that better absorbs the rotational forces.

In principle, it is intended that a non-positive connection is realized between the rotor shaft body and the shaft plug-in in the area between the fixing elements. In particular, it is provided that a press fit between the rotor shaft body and the shaft plug-in, preferably in a region between the fixing elements, is realised or set by means of an oversize, which ensures a permanent connection between the rotor shaft body and the shaft plug-in. With advantage, the press fit between the fixing elements can be adjusted, especially reduced, by the presence of the fixing elements. Preferably, it is intended that the fixing elements are formed such that the extraction forces or torques required for the respective application can be achieved. It is also conceivable that the press fit, caused by the areas between the fixing elements, is already sufficient to provide the desired permanent connection.

In particular, the oversize between the shaft plug-in and the rotor shaft body is related to the outer surface of the shaft plug-in (without fixing elements) and the rotor shaft inner surface (without fixing elements). In other words, a certain amount of oversize is already achieved without the fixing elements. This ensures that in an area between the fixing elements there is a flat installation without play. This in turn ensures optimum concentricity and centering.

The manufacture of the rotor shaft has a decisive influence on the properties of the rotor shaft and offers a number of advantages over conventional rotor shafts or those manufactured by other methods, such as the forged rotor shaft body provides increased strength, allowing the rotor shaft to be subjected to higher loads, forces and/or torques;

The complexity of the rotor shaft is lower, requires less material for its manufacture (no or less waste during manufacture), can be assembled more easily and quickly and is therefore cheaper;

ready-to-install functional surfaces or joining elements can be produced.

The oversize can be produced by the fact that the outer surface of the shaft plug-in and/or the inner surface of the rotor shaft body has at least three fixing elements, whereby preferably a material hardness of the fixing elements is greater than a material hardness of the inner surface of the rotor shaft body. The desired material hardness can be achieved by nitriding or heat treatment processes, for example inductive hardening, or by work hardening during forging or alternatively by case hardening.

The fixing elements give the rotor shaft considerable advantages:

increased axial tensile strength,
improved rotational torsional strength,
higher torques can be transmitted,
increased overall strength and load-bearing capacity, Welding operations, for example to attach the pin to the rotor shaft body, are not necessary, i.e. are not carried out, which simplifies production and reduces costs, Influencing, for example distortion, the rotor shaft due to heating can be avoided.

The rotor shaft may be part of the electrical aggregate, the electrical aggregate comprising the rotatably driven rotor shaft or connected to the rotor shaft for rotatively driving the rotor shaft. The electric aggregate can preferably be an electric motor or an electric generator. The rotor shaft can be used particularly advantageously in a vehicle, in particular a land vehicle, for example an automobile, with an electric motor.

The rotor shaft can be hollow end-to-end. An outer surface of the rotor shaft can be rotationally symmetric.

The pin can be produced in one piece with the fixing elements, preferably by forging, which advantageously simplifies the production and reduces the costs for the production and the final product.

The inner surface of the rotor shaft body and/or the outer surface of the shaft plug-in can be plastically deformed when the shaft plug-in is inserted axially into the rotor shaft body. The deformation may be realized in the fixing elements, which have a higher material hardness than the inner surface of the rotor shaft body, displacing or raising material of the inner surface of the rotor shaft body or vice versa, thereby producing a highly loadable connection between the pin or shaft plug-in and the rotor shaft body, preferably a positive and/or non-positive connection.

The connection can be designed as a toothing between the pin or the shaft plug-in and the rotor shaft body or between the shaft plug-in outer surface and the inner surface of the rotor shaft body. The toothing can further enhance the already mentioned advantages with regard to improvement of axial tensile strength, rotational torsional strength, torque load capacity and the avoidance of welding processes.

The respective fixing elements can be formed as elevations of the outer surface of the shaft plug-in and/or the inner surface of the rotor shaft body, in particular as elongated structures formed in an axial direction of the rotor shaft body, which preferably have identical parameters and/or are arranged equidistantly to one another, in particular in an azimuthal direction, i.e. along a circumference of the shaft plug-in or circumference of the rotor shaft body. This allows the pin to be better centred when the shaft plug-in is plug-ined into the rotor shaft body, so that the resulting rotor shaft is largely unbalanced.

The fixing elements can be dimensioned as follows:

the fixing element has a height greater than 0.5% or 1% and less than 5% or 2% of a shaft plug-in radius, and/or the fixing element has an axial extension of more than 1%, 3%, or 10% and less than 70%, or 90% of the axial extension of the shaft plug-in, and/or the fixing member has an azimuthal extension of more than 0.01%, 0.1%, or 1% and less than 2%, 3%, or 4% of a circumference of the shaft plug-in circumference, and/or the outer surface of the shaft plug-in has more than 2, 5 or 10 and less than 15, 20 or 40 fixing elements, and/or a degree of coverage that indicates the extent to which the fixing elements cover the shaft plug-in circumference has a value of <80%, <70%, or <60%, and >15%, >20%, or >25%.

The fixing element has a height of about 0.5 mm, a width of about 5 mm, a length of about 25 mm, and a shaft plug-in radius of about 25 to 60 mm, especially if the fixing elements are arranged on the outer surface of the shaft plug-in.

Preferably, it is provided that the one or more fixing elements on the inner surface of the rotor shaft body extend substantially over the entire length of the rotor shaft body dimensioned in the longitudinal direction. In particular, the fixing elements are produced directly in the forming process together with the rotor shaft body, for example when the rotor shaft body is drawn. However, it is also conceivable that all or only individual fixing elements extend in the longitudinal direction over only part of the entire length.

Compared to the external knurls previously known, fixing elements dimensioned in this way have the advantage of forming a significantly stronger and more pronounced toothing between the pin and the rotor shaft body when the shaft plug-in is inserted into the rotor shaft body, in particular by deforming the inner surface of the rotor shaft body. In addition, the fixing elements are sufficiently spaced along the shaft plug-in circumference and, unlike the outer knurls, when the shaft plug-in is inserted into the rotor shaft body, allow the material displaced, raised or deformed by the fixing elements from the inner surface of the rotor shaft body to be picked up in the azimuthal spaces. This makes the connection between the pin and the rotor shaft body more resilient and stronger.

One fixing element each can be wedge-shaped in the axial direction, in particular in an plug-in area or in at least part of the total length, in order to facilitate the plug-in of the shaft plug-in into the rotor shaft body. Preferably, the shaft plug-in radius i) is larger than an inner radius of the rotor shaft body in a region of a fixing member, but optionally ii) is smaller than the inner radius of the rotor shaft body in a region of a fixing member and in axial proximity to the plug-ined end of the shaft plug-in. In an area outside a fixing element, the shaft plug-in radius may be smaller than the inner radius of the rotor shaft body.

Compared to external knurls, fixing elements designed in this way have the advantage of facilitating inserting the shaft plug-in into the rotor shaft body. This allows the pin to be better centred when inserting the shaft plug-in into the rotor shaft body, so that the resulting rotor shaft is largely unbalanced.

The pin can have a pin cover designed as a radial broadening for locking and fixing the pin when it is inserted into the rotor shaft body, whereby an relief groove is preferably formed on the pin cover.

Even if the material of the fixing elements is harder than the material of the inner surface of the rotor shaft body, material can also be removed, displaced, thrown up or deformed by the fixing elements when the shaft plug-in is inserted into the rotor shaft body. The relief groove serves to pick up the material removed, displaced or thrown up by the fixing elements.

The relief groove also serves this purpose,
- to enable the shaft plug-in to be fitted or inserted flush into the rotor shaft body, since no sufficiently large chamfers or curves can be attached to the rotor shaft body, and/or
- to reduce stress peaks caused by recesses in the turning contour and their notch cause.

The pin can also have a second shaft coupling for rotary coupling with a rotary shaft.

BRIEF DESCRIPTION OF THE DRAWINGS

The disclosure is explained in more detail below using examples and drawings. The same reference signs refer to the same or corresponding elements. The features of different design examples can be combined with each other. Showing:

FIG. 1A perspective view of a pin and a rotor shaft body before inserting the shaft plug-in into the rotor shaft body, FIG. 2A side view (schematic sectional view) of a pin and a rotor shaft body before inserting the shaft plug-in into the rotor shaft body, FIG. 3A side view (schematic sectional view) of a rotor shaft, FIG. 3*a* view (schematic sectional view) of the rotor shaft according to section B-B' from FIG. 3*a*, FIG. 4*a*, 4*b* details A of the rotor shaft from FIG. 2: fixing element with curved ramp (FIG. 4*a*) and fixing element with wedge-shaped ramp (FIG. 4*b*), FIG. 5A perspective view of a pin and a rotor shaft body before inserting the shaft plug-in into the rotor shaft body according to a further embodiment of the present disclosure, FIG. 6A side view (schematic sectional view) of a pin and a rotor shaft body before the insertion of the shaft plug-in into the rotor shaft body according to the further embodiment of the present disclosure, FIG. 7*a* side view (schematic sectional view) of a rotor shaft, and FIG. 7*a* view (schematic sectional view) of the rotor shaft according to section B-B' from FIG. 3*a* according to the further embodiment of the present disclosure.

FIG. 8*a* side view of a pin and a rotor shaft body before inserting the shaft plug-in into the rotor shaft body according to a second further embodiment of the present disclosure FIG. 9*a* side view (schematic sectional view) of a rotor shaft, and FIG. 9*a* view (schematic sectional view) of the rotor shaft according to the section B-B' from FIG. 3*a* according to the second further version of this disclosure.

DETAILED DESCRIPTION

Figure 1:
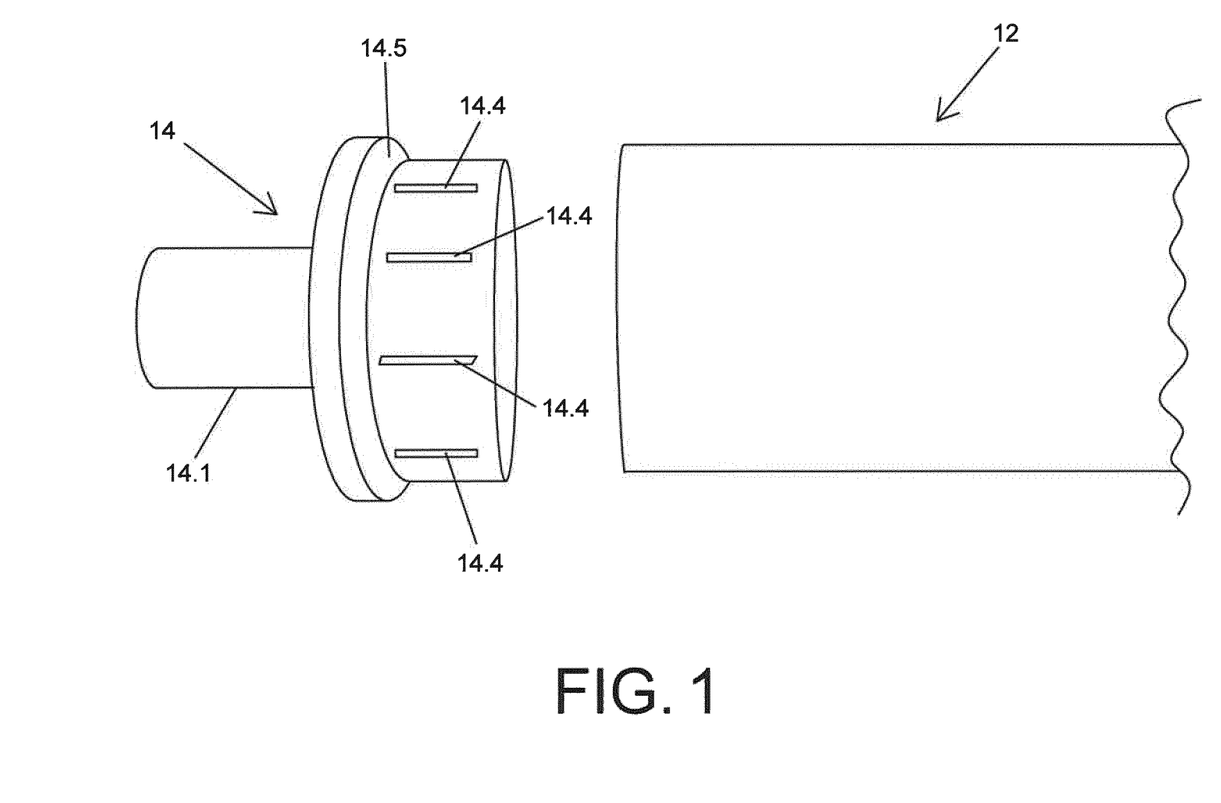
Figure 2:
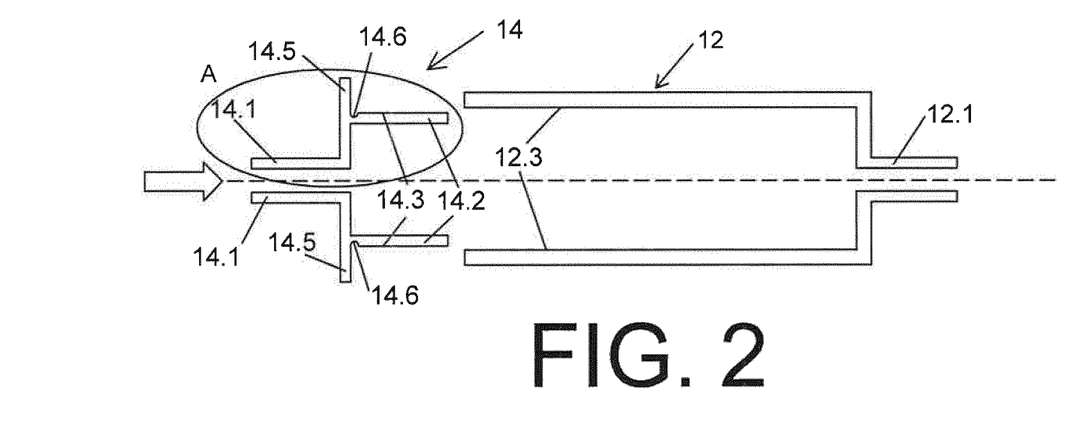

FIG. 1 shows a perspective view and FIG. 2 shows a side view of a rotor shaft body 12 and a pin 14 with a cylindrical shaft plug-in 14.2 before inserting the shaft plug-in 14.2 into the rotor shaft body 12.

The rotor shaft body 12 produced by forging is formed as a hollow rotary body open at at least one first end for receiving the pin 14. The rotor shaft body 12 has an outside diameter preferably 50 to 120 mm, especially preferred >100 mm. The rotor shaft body 12 has advantage only a first shaft coupling 12.1 at its second end. In this preferred embodiment, this is forged in one piece with the rotor shaft body 12.

In this case the rotor shaft body 12 is rotationally symmetrical, but a rotor shaft body 12 with non-rotationally symmetrical outer contours can also be used, since the shaft plug-in 14.2 is inserted axially into the rotor shaft body 12, in particular pressed.

There is an oversize between an outer surface of the shaft plug-in 14.3 and an inner surface of the rotor shaft body 12.3. The oversize means that a shaft plug-in radius or radius of the outer surface of the shaft plug-in 14.3 is at least partially larger than a radius of the inner surface of the rotor shaft body 12.3.

The oversize is produced by the fact that the outer surface of the shaft plug-in 14.3 has a plurality of fixing elements 14.4, wherein a material hardness of the fixing elements 14.4 is greater than a material hardness of the inner surface of the rotor shaft body 12.3. Each fixing element 14.4 is formed as an axially elongated elevation of the outer surface of the shaft plug-in 14.3.

Each fixing Element 14.4 has a height in a range of [5-15]% of a shaft plug-in radius, a width or azimuthal extension <3% of a shaft plug-in circumference, and a length or axial extension in a range of [70-90]% of a length or axial extension of shaft plug-in 14.2.

Fixing elements 14.4 dimensioned in this way have the advantage of forming a clear and pronounced toothing between the pin 14 and the rotor shaft body 12 when the shaft plug-in 14.2 (see FIG. 3a) is plug-ined into the rotor shaft body 12. In addition, the fixing elements 14.4 are sufficiently spaced apart along the shaft plug-in circumference and allow the material displaced by the shaft plug-in 14.2 into the rotor shaft body 12 when the shaft plug-in 14.4 is plug-ined into the rotor shaft body 12 to be picked up in the azimuthal spaces by the fixing elements 14.4. This increases the load capacity of the connection between the pin 14 and the rotor shaft body 12 and the rotor shaft 10 as a whole.

The pin 14 has a pin cover 14.5 in the form of a radial broadening for locking or fixing the pin 14 when pushing it into the rotor shaft body 12, whereby an undercut 14.6 is formed on the pin cover 14.5.

The shaft plug-in 14.2 is pushed into the rotor shaft body 12 by axial pressing on the pin 14 or pulling in the pin 14. The inner surface of the rotor shaft body 12.3 is plastically deformed when the shaft plug-in 14.2 is plug-ined into the rotor shaft body 12, resulting in a positive and/or non-positive connection between the pin 14 or the shaft plug-in 14.2 and the rotor shaft body 12.

Even if the material of the fixing elements 14.4 is harder than the material of the inner surface of the rotor shaft body 12.3, material can also be removed, displaced, thrown up or deformed by the fixing elements 14.4 when plug-ining the shaft plug-in 14.2 into the rotor shaft body 12. The relief groove 14.6 is used to pick up material removed or deformed by the fixing elements 14.4.

The relief groove 14.6 can also be used for an undercut press for axial fixing. The undercut 14.6 can be used to i) collect material thrown up during pressing, and ii) forge the elements evenly with constant dimensions up to the bottom, because it is a difficult task for forming. Irregularities may occur during forging up to the bottom, which do not allow a tight connection of the shaft.

As an alternative to the relief groove 14.6, the shaft can be handled accordingly in order to compensate for the irregularities so that contact with the radial cover area is ensured.

A further variant is the targeted introduction of the material accumulation in the edge area of the shaft (undercut). The edge of the shaft is widened in such a way that it becomes thickened. When joining, the expanded edge is pressed flush with the remaining outer diameter of the shaft into the relief groove 14.6. This creates an additional axial pulling off protection.

Figure 3A:
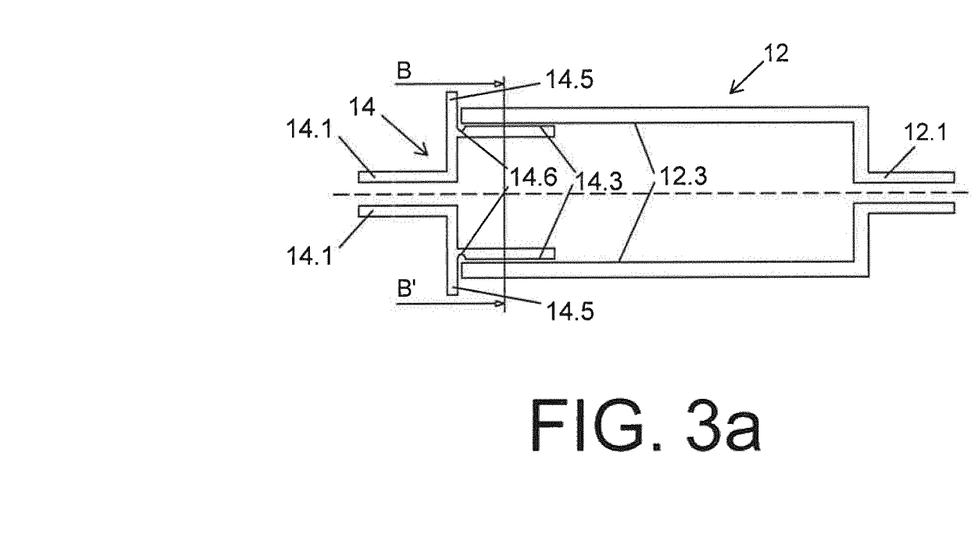
Figure 3B:
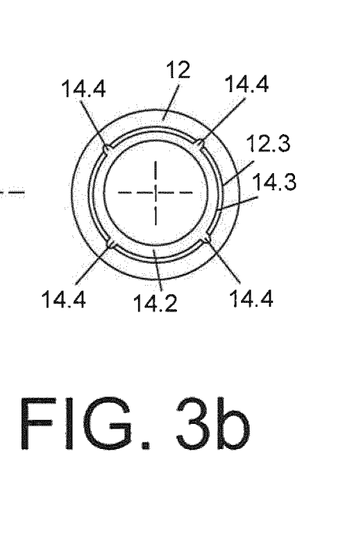

The condition after inserting, i.e. the finished rotor shaft 10, is shown in FIG. 3a, 3b. FIG. 3b shows that a shaft plug-in radius in a region of a fixing member 14.4 is larger than an inner radius of the rotor shaft body 12 and in a region outside a fixing member 14.4 is smaller than the inner radius of the rotor shaft body 12, thereby forming the oversize. The fixing elements 14.4 are evenly distributed along the shaft plug-in circumference, i.e. equidistantly arranged in the azimuthal direction. This allows the pin 14 to be better centred when inserting the shaft plug-in 14.2 into the rotor shaft body 12, so that the rotor shaft 10 obtained is largely unbalanced.

Figure 4A:
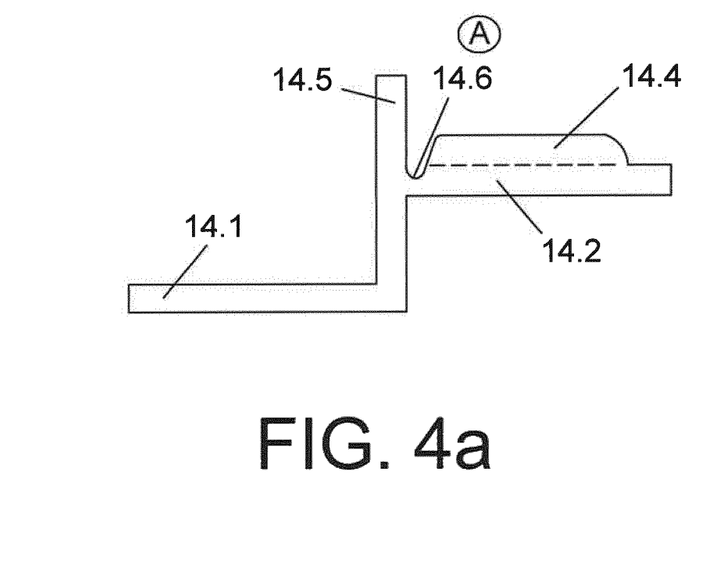
Figure 4B:
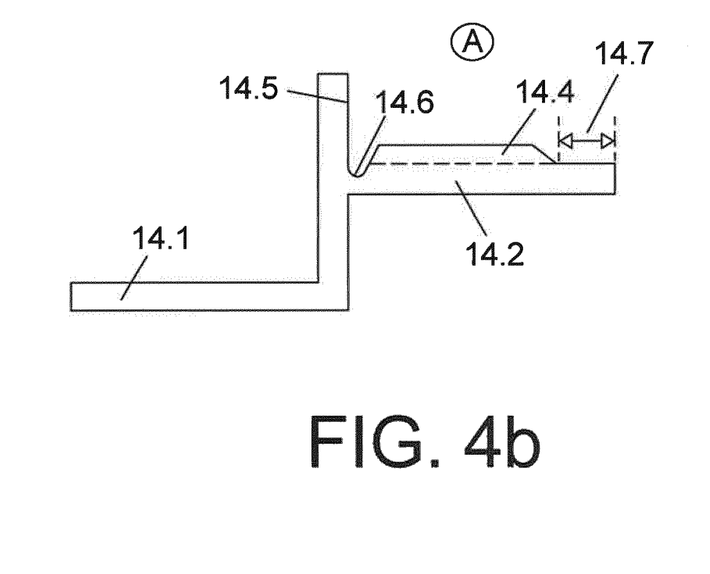
Figure 5:
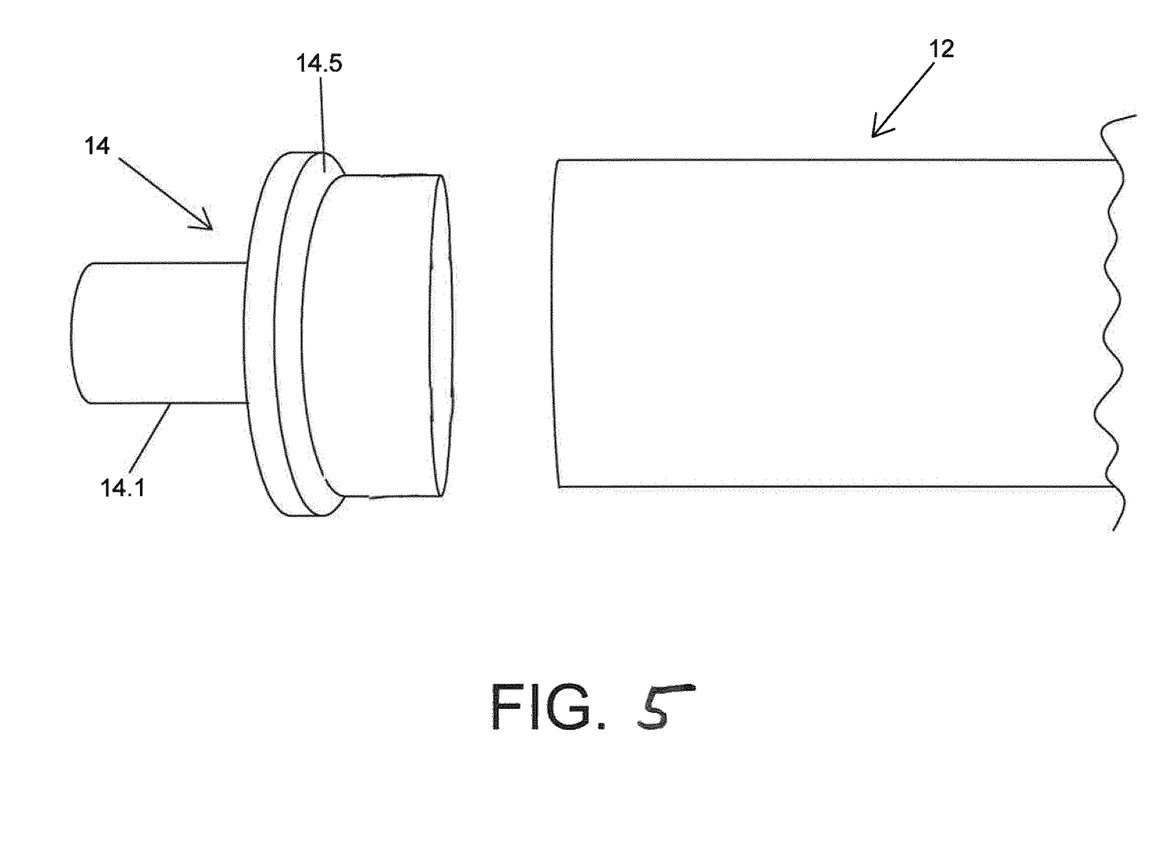
Figure 6:
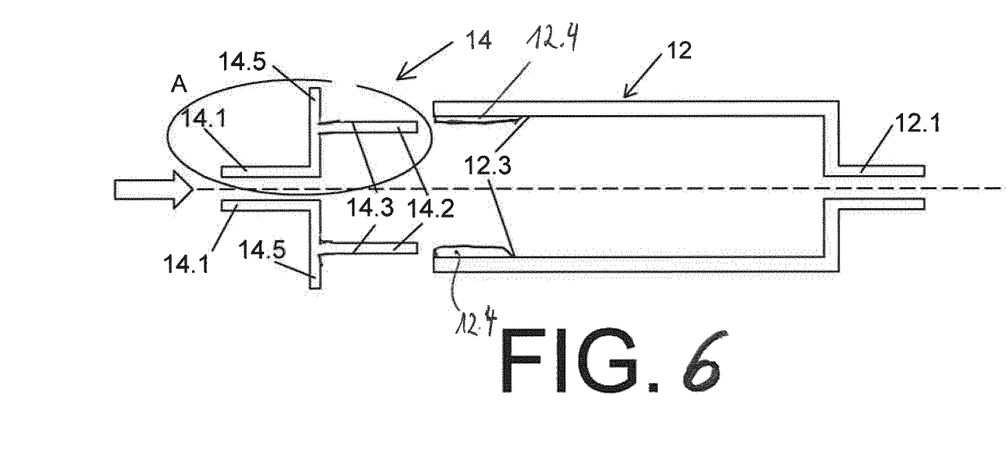
Figure 7A:
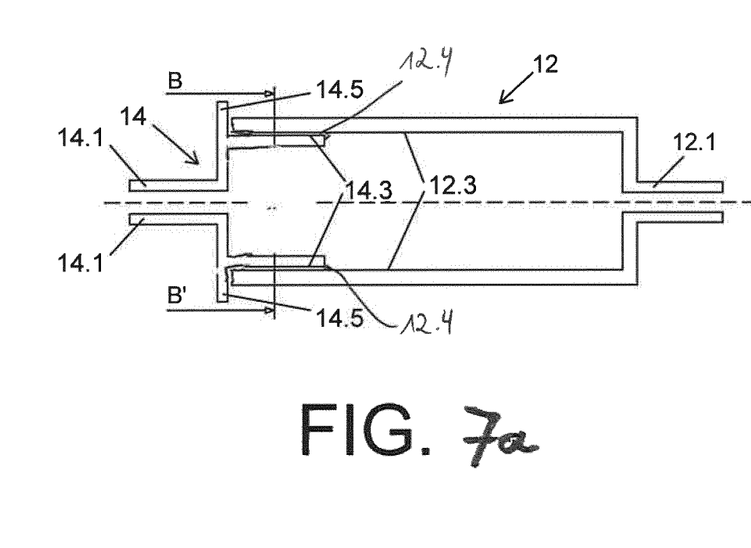
Figure 7B:
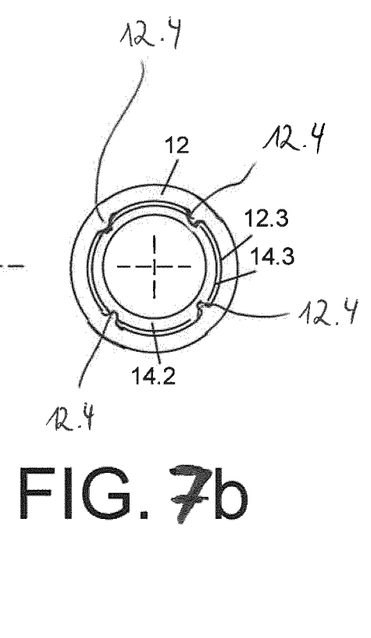

FIG. 4a, 4b each show a fixing element which is in any case partly wedge-shaped or curved and/or partly raised in the axial direction: in FIG. 4a the flank of the wedge is concave curved, in FIG. 4b it is wedge-shaped. In both cases i) the insertion of the shaft plug-in into the rotor shaft body is facilitated and ii) the pin 14 is better centred when inserting the shaft plug-in 14.2 into the rotor shaft body 12, so that the rotor shaft 10 obtained is largely unbalanced. Furthermore, a wedge area with a thickness which is located offset back by a distance of 14.7 in the direction of the second shaft coupling 14.1. increases the frictional connection during pressing. Distance 14.7 facilitates the insertion of the pin 14 into the rotor shaft body 12.

The pin 14, which is preferably in the form of a hollow pin or optionally as massiv pin, comprises a second shaft coupling 14.2 for rotary coupling with a rotary shaft of an undisplayed electrical aggregate, in particular an electric motor, for transmitting a torque to the rotor shaft 10.

Similarly, the rotor shaft body comprises 12, at the second axial end a first shaft coupling 12.1, to which an element to be driven by the rotor shaft 10, which is not shown here, can be brought into mechanical active contact.

Preferably, the manufacturing process or rotor shaft 10 includes one or more of the following features. The features can be combined with each other if technically reasonable.

The oversize is produced by the fact that the outer surface of the shaft plug-in 14.3 has at least two three fixing elements 14.4, wherein preferably a material hardness of the fixing elements 14.4 is bigger than a material hardness of the inner surface of the rotor shaft body 12.3.

The pin 14 is produced in one piece with the fixing elements 14.4 by means of forging.

The inner surface of the rotor shaft body 12.3 is plastically deformed when the shaft plug-in 14.2 is inserted into the rotor shaft body 12, resulting in a positive and/or non-positive connection between the pin 14 or the shaft plug-in 14.2 and the rotor shaft body 12.

The insertion of the shaft plug-in 14.2 into the rotor shaft body 12 is caused by axial pressing on the pin 14 or by retracting in the pin 14.

Respectively, one fixing element 14.4 each is designed as an elevation of the outer surface of the shaft plug-in 14.3, in particular as an elongated structure in an axial direction of the rotor shaft body 12, preferably with a height of more than 0.1%, 0.5% or 1% and less than 5%, 4% or 2% of a shaft plug-in radius.

Respectively, one fixing element 14.4 wedge-shaped in the axial direction in order to cause centring of shaft plug-in 14.2 and rotor shaft body 12 and to facilitate plug-in of the shaft plug-in 14.2 into the rotor shaft body 12, wherein the shaft plug-in radius i) preferably is greater than an inner radius of the rotor shaft body 12 in a region of a fixing element 14.4, but optionally ii) is smaller than the inner radius of the rotor shaft body 12 in a region of a fixing element 14.4 and in axial proximity to the inserted end of the shaft plug-in 14.2, and iii) is smaller than the inner radius of the rotor shaft body 12 in particular in a region outside a fixing element 14.4.

Respectively, one fixing element 14.4 has i) an axial extension of more than 1%, 3%, or 10% and less than 15%, 50%, or 85% of a length or axial extension of the shaft plug-in 14.2, and ii) preferably an azimuthal extension of more than 0.1%, 0.5%, or 1% and less than 2%, 3%, or 4% of a shaft plug-in circumference.

The outer surface of the shaft plug-in 14.3 has more than 3, 5 or 10 and less than 15, 20, or 40 fixing elements 14.4, preferably a degree of coverage indicating the extent to which the fixing elements cover the shaft plug-in circumference having a value of <50%, <40%, or <30%, and >1%, >5%, or >10%.

The fixing elements 14.4 are evenly distributed along a shaft plug-in circumference.

Respectively, one fixing element 14.4 is designed as a conical structure in the radial direction, at least in some areas.

The pin 14 has a pin cover 14.5 in the form of a radial broadening for locking and fixing the pin 14 when it is inserted into the rotor shaft body 12, preferably with an relief groove 14.6 being formed on the pin cover 14.5 for receiving material which is removed, displaced or thrown up when the pin 14 is inserted into the rotor shaft body 12.

The pin 14 has a second shaft coupling 14.2 for rotary coupling with a rotary shaft.

FIGS. 5, 6, 7a and 7b illustrate a perspective view of a pin 14 and a rotor shaft body 12 before inserting the shaft plug-in 14.2 into the rotor shaft body 12 according to a further embodiment of the present disclosure. Mainly, the embodiment shown in FIGS. 5 to 7b corresponds to the embodiment shown in FIGS. 1 to 4b and differs essentially only with regard to the arrangement of the fixing elements 12.4. In particular, it is provided in accordance with the further design that the fixing elements 12.4 protrude only or also from the rotor shaft body—inner surface 12.3, in particular projecting inwards. The outer surface of the shaft plug-in 14.3, on the other hand, is free of fixing elements 14.4 or elevations or, as described for FIGS. 1-4, itself has (further) fixing elements. The fixing elements 12.4 protrude from the inner surface 12.3 of the rotor shaft body. In particular, it is provided that an oversize also exists in the area between the fixing elements, so that the greatest possible additional frictional connection is formed between the rotor shaft body and the shaft plug-in. The press fit formed by the oversize in the areas between the fixing elements can, however, be reduced or adapted with advantage due to the presence of the fixing elements.

Preferably, the at least one inner surface of the rotor shaft body 12.3 has at least three fixing elements 12.4, wherein a material hardness of the fixing elements 12.4 is particularly preferably greater than a material hardness of the at least one outer surface of the shaft plug-in 14.3. Furthermore, it is provided that respectively one fixing element 12.4 is formed as an elevation of the inner surface of the rotor shaft body 12.3, in particular as an elongated structure along an axial direction of the rotor shaft body 12, preferably having a height of more than 0.1%, 0.5% or 1% and less than 5%, 4% or 2% of a shaft plug-in radius or a rotor shaft body inner radius. The inner body radius or the rotor shaft body—inner radius is
   i) preferably smaller than the shaft plug-in radius of the shaft plug-in 14.2 in a region of a fixing element 12.4, but if necessary
   ii) greater than the shaft plug-in radius in a region of a fixing element 12.4 and in axial proximity to the inserted end of the shaft plug-in 14.2 and/or
   iii) in particular greater than the inner radius of the rotor shaft body 12 in an area outside the fixing element 12.4.

Furthermore, it is planned that no gap is formed between the outer surface of the shaft plug-in 14.3 and the inner surface of the rotor shaft in the assembled state.

Figure 8:
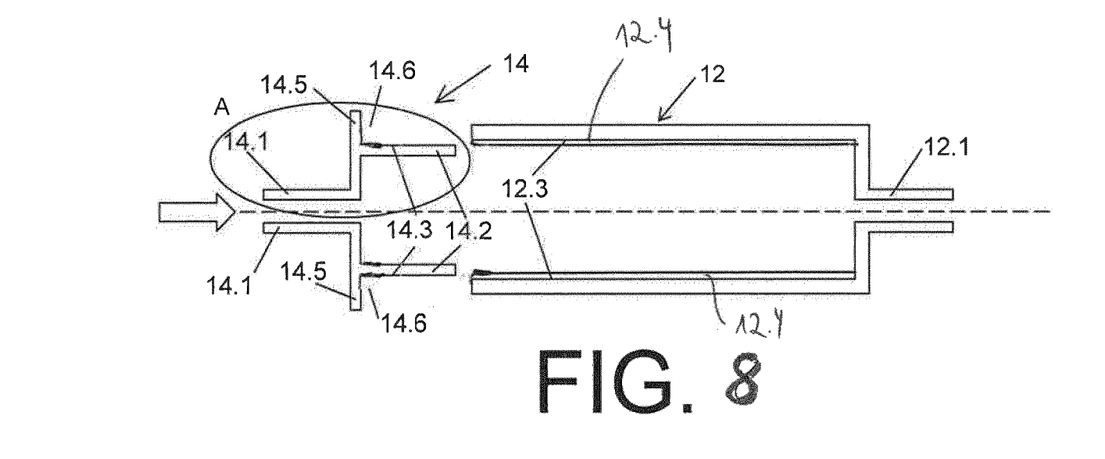
Figure 9A:
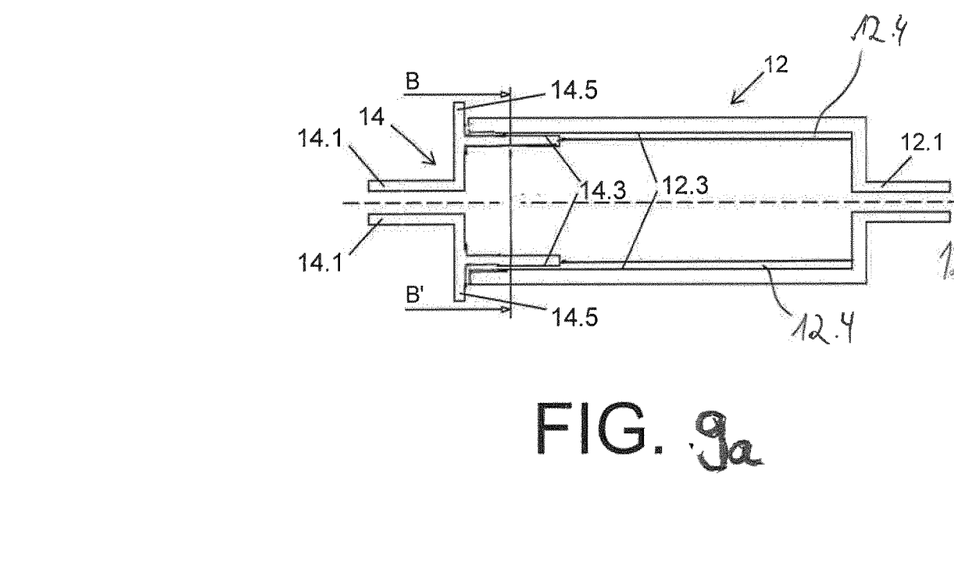
Figure 9B:
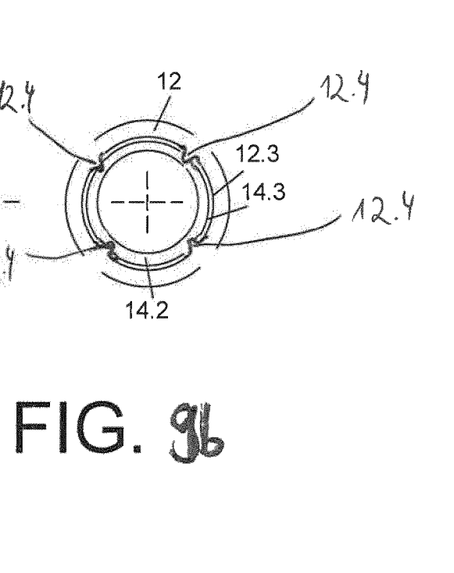

FIGS. 8, 9a and 9b illustrate a perspective view of a pin 14 and a rotor shaft body 12 before the insertion of the shaft plug-in 14.2 into the rotor shaft body 12 according to another embodiment of the present disclosure. The only essential difference between the rotor shaft body and the one in FIGS. 5 to 8b is that the fixing element on the inner surface of the rotor shaft body extends essentially over the entire length of the rotor shaft body measured in the longitudinal direction.

The invention claimed is:

1. A method for manufacturing a rotor shaft, comprising the steps:
   a) providing a pin comprising a shaft plug-in;
   b) producing a hollow rotor shaft body being open at a first end for receiving the pin and in form of a rotary body, wherein an oversize exists between an outer surface of the shaft plug-in and an inner surface of the rotor shaft body; and
   c) Inserting the shaft plug-in into the rotor shaft body for fastening the pin to the rotor shaft body, wherein the inner surface of the rotor shaft body and/or outer surface of the shaft plug-in are plastically deformed during inserting of the shaft plug-in into the rotor shaft body, as a result of which a positive fit is caused between the pin or the shaft plug-in and the rotor shaft body, and wherein the connection between the pin or the shaft plug-in and the rotor shaft body is formed as a toothing, further comprising at least one of the following features;
the inner surface of the rotor shaft body and/or the outer surface of the shaft plug-in is plastically deformed during plug-in of the shaft plug-in into the rotor shaft body, as a result of which a frictional connection is caused between the pin or the shaft plug-in and the rotor shaft body;
the inserting of the shaft plug-in into the rotor shaft body is caused by axial pressing on the pin or retraction of the pin
the oversize is produced by the fact that the at least one outer surface of the shaft plug-in has at least three fixing elements, wherein a material hardness of the fixing elements being greater than a material hardness of the at least one inner surface of the rotor shaft body;
the oversize is caused by the fact that the at least one inner surface of the rotor shaft body has at least three fixing elements, wherein a material hardness of the fixing elements being greater than a material hardness of the at least one outer surface of the shaft plug-in; and
the pin is produced in one piece with the fixing elements by means of forging.

2. The method according to claim 1,
comprising at least one of the following features;
the fixing element is constructed as an elevation of the outer surface of the shaft plug-in and/or the inner surface of the rotor shaft body, and/or as an elongate structure constructed in an axial direction of the rotor shaft body, with a height of more than 0.1%, and less than 5%, of a shaft plug-in radius;
the fixing element is wedge-shaped in the axial direction, in order to cause a centring of the shaft plug-in and rotor shaft body and to facilitate inserting of the shaft plug-in into the rotor shaft body, wherein the shaft plug-in radius:
   i) is greater than an internal radius of the rotor shaft body in a region of a fixing element, but optionally
   ii) is smaller than the inner radius of the rotor shaft body in a region of a fixing element and in axial proximity to the inserted end of the shaft plug-in, and iii) is smaller than the inner radius of the rotor shaft body in a region outside a fixing element, and/or wherein the inner radius of the rotor shaft body is
i) is smaller than the shaft plug-in radius of the shaft plug-in in a region of a fixing element, but optionally
ii) is greater than the shaft plug-in radius in a region of a fixing element and in axial proximity to the inserted end of the shaft plug-in, and
iii) is greater than the inner radius of the rotor shaft body in a region outside the fixing element.

3. The method according to claim 1,
comprising
at least one of the following features;
the fixing element has
i) an axial extension of more than 1% and less than 85% of a length or axial extension of the shaft plug-in, and
ii) an azimuthal extent of greater than 0.1% and less than 4% of a circumference of the shaft plug-in;
the outer surface of the shaft plug-in has more than 2 and less than 40 fixing elements, a degree of coverage indicating the extent to which the fixing elements cover the circumference of the shaft plug-in or the circumference of the rotor shaft has a value of <50% and >1%;
the fixing elements are uniformly distributed along a circumference of the shaft plug-in and/or a circumference of the rotor shaft body.

4. The method according to claim 1,
wherein the fixing member or plurality of fixing members on the inner surface of the rotor shaft body extend substantially over the entire longitudinally dimensioned length of the rotor shaft body and/or over a portion of the longitudinally dimensioned length of the rotor shaft body.

5. A rotor shaft comprising:
a pin with a shaft plug-in, and
a rotor shaft body being open at least a first end for receiving said pin and formed as a hollow rotary body,
wherein an oversize exists between an outer surface of the shaft plug-in and an inner surface of the rotor shaft body and the shaft plug-in is inserted into the open end of the rotor shaft body for fastening the pin to the rotor shaft body, characterized in that the inner surface of the rotor shaft body and/or the outer surface of the shaft plug-in is plastically deformed during inserting the shaft plug-in into the rotor shaft body, as a result of which a from fit is caused between the pin or the shaft plug-in and the rotor shaft body, and the connection between the pin or the shaft plug-in and the rotor shaft body is formed as toothing,
wherein the outer surface of the shaft plug-in has at least three fixing elements for producing the oversize, wherein a material hardness of the fixing elements is greater than a material hardness of the inner surface of the rotor shaft body;
wherein the inner surface of the rotor shaft body has at least three fixing elements for producing the oversize, wherein a material hardness of the fixing elements is greater than a material hardness of the outer surface of the shaft plug-in; and
wherein the pin is produced in one piece with the fixing elements by means of forging.

6. The rotor shaft according to claim 5,
comprising at least one of the following features;
a fixing element is constructed as an elevation of the outer surface of the shaft plug-in or the inner surface of the rotor shaft body, or as an elongated structure in an axial direction of the rotor shaft body, which is wedge-shaped in the axial direction in order to facilitate the inserting of the pin into the rotor shaft body;
the rotor shaft body has a first shaft coupling at a second end;
the pin shows
i) a pin cover in the form of a radial broadening for locking and fixing the pin during inserting into the rotor shaft body,
ii) a second shaft coupling for rotary coupling with a rotary shaft, and
iii) a relief groove formed on the pin cover for receiving material which has been removed, displaced or thrown up during inserting the pin into the rotor shaft body.

7. A rotor shaft comprising:
a pin with a shaft plug-in, and
a rotor shaft body being open at least a first end for receiving said pin and formed as a hollow rotary body,
wherein an oversize exists between an outer surface of the shaft plug-in and an inner surface of the rotor shaft body and the shaft plug-in is inserted into the open end of the rotor shaft body for fastening the pin to the rotor shaft body, characterized in that the inner surface of the rotor shaft body and/or the outer surface of the shaft plug-in is plastically deformed during inserting the shaft plug-in into the rotor shaft body, as a result of which a from fit is caused between the pin or the shaft plug-in and the rotor shaft body, and the connection between the pin or the shaft plug-in and the rotor shaft body is formed as toothing,
wherein the rotor shaft comprises at least one of the following features:
a fixing element is constructed as an elevation of the outer surface of the shaft plug-in or the inner surface of the rotor shaft body, or as an elongated structure in an axial direction of the rotor shaft body, which is wedge-shaped in the axial direction in order to facilitate the inserting of the pin into the rotor shaft body;
the rotor shaft body has a first shaft coupling at a second end;
wherein the pin shows
iv) a pin cover in the form of a radial broadening for locking and fixing the pin during inserting into the rotor shaft body,
v) a second shaft coupling for rotary coupling with a rotary shaft, and
vi) a relief groove formed on the pin cover for receiving material which has been removed, displaced or thrown up during inserting the pin into the rotor shaft body.

* * * * *